United States Patent
Jeon et al.

(10) Patent No.: US 9,225,466 B2
(45) Date of Patent: Dec. 29, 2015

(54) APPARATUS AND METHOD FOR CONTROLLING INTERFERENCE IN A WIRELESS COMMUNICATION SYSTEM

(71) Applicant: Samsung Electronics Co., Ltd., Gyeonggi-do (KR)

(72) Inventors: Joseph Jeon, Gyeonggi-do (KR); Eun-Yong Kim, Gyeonggi-do (KR); Ho-Joong Kwon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 13 days.

(21) Appl. No.: 14/219,663

(22) Filed: Mar. 19, 2014

(65) Prior Publication Data

US 2014/0287788 A1    Sep. 25, 2014

(30) Foreign Application Priority Data

Mar. 19, 2013 (KR) .......... 10-2013-0029391
Mar. 5, 2014 (KR) .......... 10-2014-0025871

(51) Int. Cl.
*H04W 36/00* (2009.01)
*H04L 1/00* (2006.01)
*H04W 28/22* (2009.01)
*H04W 72/08* (2009.01)

(52) U.S. Cl.
CPC .............. *H04L 1/0002* (2013.01); *H04W 28/22* (2013.01); *H04W 72/082* (2013.01)

(58) Field of Classification Search
USPC ........... 455/443, 444, 448, 450–452.2, 67.11, 455/67.13, 63.1
See application file for complete search history.

(56) References Cited

U.S. PATENT DOCUMENTS

| | | | |
|---|---|---|---|
| 7,903,572 B2 | 3/2011 | Kwon et al. | |
| 2009/0130980 A1 | 5/2009 | Palanki et al. | |
| 2009/0270109 A1* | 10/2009 | Wang Helmersson et al. | 455/453 |
| 2010/0002607 A1* | 1/2010 | Kim et al. | 370/280 |
| 2010/0002643 A1 | 1/2010 | Han et al. | |
| 2010/0278141 A1* | 11/2010 | Choi-Grogan et al. | 370/331 |
| 2011/0096857 A1 | 4/2011 | Koo et al. | |
| 2012/0258724 A1* | 10/2012 | Kim et al. | 455/452.2 |
| 2013/0195053 A1 | 8/2013 | Jeon et al. | |
| 2013/0258895 A1* | 10/2013 | Kim et al. | 370/252 |
| 2014/0329527 A1* | 11/2014 | Choi-Grogan et al. | 455/436 |
| 2015/0017993 A1* | 1/2015 | Ishii | 455/444 |

FOREIGN PATENT DOCUMENTS

| | | |
|---|---|---|
| JP | 2008-508833 | 3/2008 |
| KR | 1020080063629 | 7/2008 |
| WO | WO 2009/123515 | 10/2009 |
| WO | WO 2012/107111 | 8/2012 |

* cited by examiner

*Primary Examiner* — Fayyaz Alam
(74) *Attorney, Agent, or Firm* — The Farrell Law Firm, P.C.

(57) ABSTRACT

Methods and apparatus are provided for controlling interference by a TP in a wireless communication system. A first message, which includes channel quality information for the TP, is received from a terminal to which the TP provides a communication service. A second message, which includes received power information for a reference signal received from the terminal, is received from at least one neighbor TP. A data transmission rate is determined for the terminal based on the channel quality information and the received power information.

18 Claims, 3 Drawing Sheets

APPARATUS AND METHOD FOR CONTROLLING INTERFERENCE IN A WIRELESS COMMUNICATION SYSTEM

PRIORITY

This application claims priority under 35 U.S.C. §119(a) to Korean patent applications filed in the Korean Intellectual Property Office on Mar. 19, 2013 and Mar. 5, 2014, and assigned Serial Nos. 10-2013-0029391 and 10-2014-0025871, respectfully, the disclosures of which are incorporated herein by reference.

BACKGROUND OF THE INVENTION

1. Field of the Invention

The present invention relates to a method and apparatus for controlling interference between channels in a wireless communication system.

2. Description of the Related Art

In a wireless communication system, a Transmission Point (TP), also known as a Base Station (BS), may determine a data transmission rate by estimating a state of a channel to a terminal, and transmit data to the terminal at the determined transmission rate. The TP may estimate the channel state based on channel information that the TP has directly estimated using the terminal's receiving channel information, which the TP has received from the terminal as a feedback, or using a signal received from the terminal.

When the TP estimates the channel state based on the receiving channel information fed back from the terminal, the receiving channel information may be received in periods that are determined according to a related standard of the communication system and its implementation. The TP may determine a transmission rate of the next transmission time for the terminal depending on the estimated channel state.

The receiving channel information may include information about the received signal strength from the serving TP, or information indicating the quality of the received signal, compared to that of ambient interference. The receiving channel information may be represented in, for example, Channel Quality Indexes (CQIs). The receiving channel information may represent the channel state at the time the terminal receives a related signal.

In the wireless communication system to which an interference control technique is applied, the channel state needs to be changed depending on whether an interference signal is controlled. Channel information between the terminal and its neighbor TPs needs to be used in order to estimate the changed channel state. However, there is a limit in acquiring the channel information due to the constraints of resources between the terminal and the neighbor TPs. This presents difficulties in estimating the accurate channel state.

SUMMARY OF THE INVENTION

The present invention has been made to address at least the above problems and/or disadvantages and to provide at least the advantages described below. Accordingly, an aspect of the present invention provides a method and an apparatus for controlling interference by a TP in a wireless communication system.

In accordance with an aspect of the present invention, a method is provided for controlling interference by a TP in a wireless communication system. A first message, which includes channel quality information for the TP, is received from a terminal to which the TP provides a communication service. A second message, which includes received power information for a reference signal received from the terminal, is received from at least one neighbor TP. A data transmission rate is determined for the terminal based on the channel quality information and the received power information.

In accordance with another aspect of the present invention, a TP is provided for controlling interference in a wireless communication system. The TP includes a receiver configured to receive a first message, which includes channel quality information for the TP, from a terminal to which the TP provides a communication service, and to receive a second message, which includes received power information for a reference signal received from the terminal, from at least one neighbor TP. The TP also includes a controller configured to determine a data transmission rate for the terminal based on the channel quality information and the received power information.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used in the following description and claims are not limited to their dictionary meanings, but are merely used by the inventor to enable a clear and consistent understanding of the disclosure. Accordingly, it should be apparent to those skilled in the art that the following description of embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
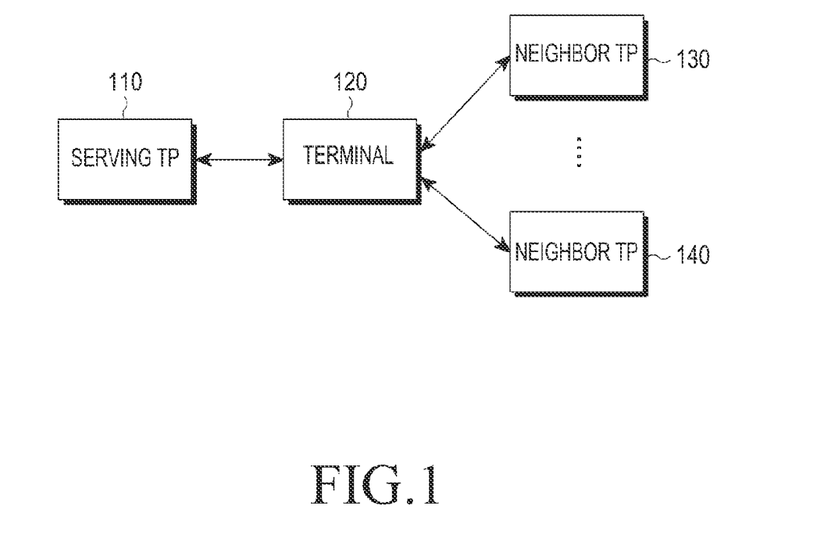
FIG. 1 is a diagram illustrating signaling between a terminal and TPs in a wireless communication system, according to an embodiment of the present invention.

FIG. 1 is a diagram illustrating an example of signaling between a terminal and TPs in a wireless communication system, according to an embodiment of the present invention.

Referring to FIG. 1, the illustrated wireless communication system includes a terminal 120, a serving TP 110 providing a communication service to the terminal 120, and a plurality of neighbor TPs 130 and 140 located near the terminal 120.

Figure 4:
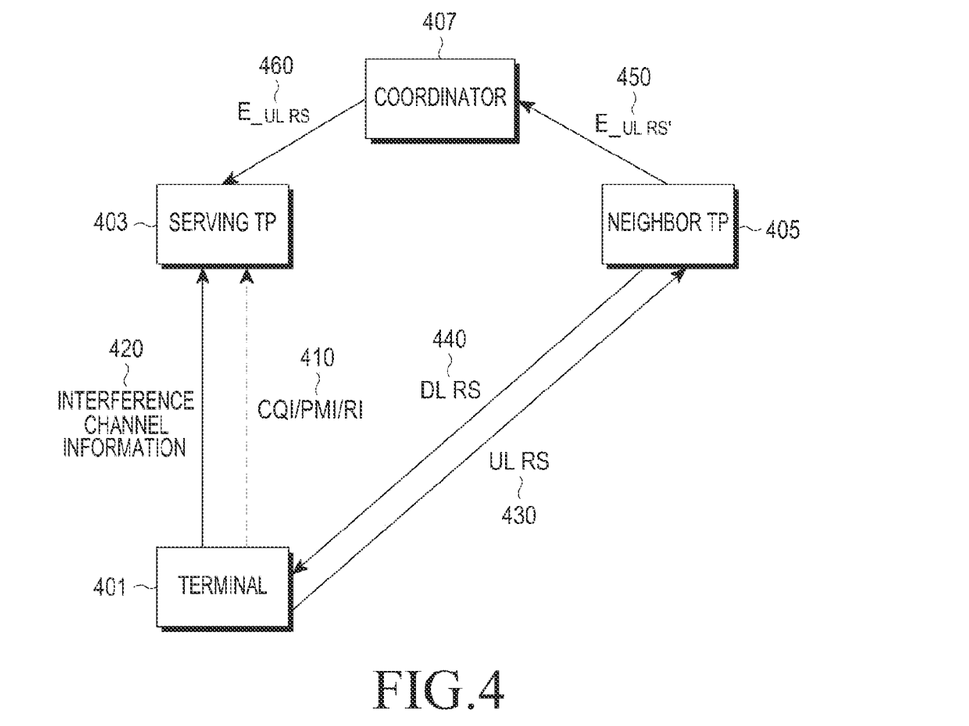
FIG. 4 is a diagram illustrating the acquiring and exchanging of channel information for channel estimation, according to another embodiment of the present invention.

The serving TP 110 may determine a data transmission rate for the terminal 120, and determine, in a separate manner, whether the neighbor TPs 130 and 140 interfere with the terminal 120 at a transmission time. One manner of determining by the serving TP 110 whether the neighbor TPs 130 and 140 interfere with the terminal 120 corresponds to a manner of receiving interference control information of each neighbor TP directly from the neighbor TPs 130 and 140, or of acquiring interference control information or commands indirectly from a separate coordinator 407, as illustrated in FIG. 4. Information indicating whether the neighbor TPs 130 and 140 interfere with the terminal 120 is information about a transmission time unit. The information may be information about a data transmission by each TP, for each sub-band constituting the frequency domain, and may be output level (or power level) information for data transmission by each TP.

Receiving channel information of the terminal 120, which the serving TP 110 has received from the terminal 120 as a feedback, may be a signal strength of interference caused by the neighbor TPs 130 and 140, compared to a signal strength from the serving TP 110.

Regarding the channel information between the terminal 120 and the neighbor TP 130 (or 140), the terminal 120 may directly receive information about the neighbor TP 130 (or 140) and feed it back to the serving TP 110, or the terminal 120 may receive the terminal's Uplink (UL) transmission information from the neighbor TP 130 (or 140) and forward it to the serving TP 110.

When the terminal 120 directly receives information about the neighbor TP 130 (or 140) and feeds it back to the serving TP 110, the information about the neighbor TP 130 (or 140) may be, for example, measurement report information. When the terminal 120 receives the terminal's UL transmission information from the neighbor TP 130 (or 140) and forwards it to the serving TP 110, the terminal's UL transmission information may be received information of the neighbor TP 130 (or 140) for, for example, a terminal's Sounding Reference Signal (SRS). The neighbor TP 130 (or 140) may compensate received power of the SRS with Downlink (DL) transmit power, and use it as relative channel information between the terminal 120 and the neighbor TP 130 (or 140). As described in detail below, in an embodiment of the present invention, the SRS-based relative channel information is referred to as an SRS value.

The channel information between the terminal 120 and the neighbor TP 130 (or 140), which is obtained in this manner, may be limited due to reasons such as transport overhead in UL resources. For example, in accordance with the Long Term Evolution (LTE) standard, the number of reports on channel state information that a terminal can feed back may be limited to a maximum of 4 at the same time, and the number of TP measurement reports that a terminal can feed back may be limited to a maximum of 8 at the same time.

A transmission rate R for the terminal 120 may be calculated using Equation (1) below. For example, a transmission rate R for a terminal k of a serving TP A may be determined taking into account a Signal to Interference-plus-Noise Ratio (SINR) between the terminal k and the serving TP A.

$$R(A,k) = f(\underline{SINR}(A,k)) + \underline{OLRC}(k)$$

$$SINR(A,k) = RxP(A,k)/(I\_k + N) \quad (1)$$

In Equation (1), f denotes a function value for changing an SINR to coincide with the transmission rate including the terminal's receive gain, and OLRC denotes a value for adjusting the transmission rate based on the terminal's feedback (e.g., acknowledge (Ack)/Negative Acknowledge (Nack) feedback). OLRC may be added to the SINR(A,k) value itself, or may be added to a f(SINR(A,k)) value as in Equation (1).

In addition, RxP(A,k) denotes strength of the signal that the terminal k has received from the serving TP A, I_k denotes a strength for the interference signal that the terminal k receives from all neighbor TPs, and N denotes the thermal noise. The received signal strength and the interference signal strength may be, for example, received signal power and interference signal power, respectively.

SINR(A, k) is a value that is calculated based on the channel information fed back from the terminal k, and may be calculated mainly based on the CQI fed back from the terminal k. Although it is assumed herein that the serving TP is configured to calculate an SINR based on the CQI fed back from the terminal, the SINR may be calculated based on the Precoding Matrix Index (PMI) or the Rank index (RI) fed back from the terminal.

The CQI fed back from the terminal may vary depending on whether the interference signal received from the neighbor TP is subject to interference control and whether the neighbor TP transmits data. As described in detail below, in an embodiment of the present invention, disclosure, the CQI, which is fed back from the terminal, is considered in a situation where all neighbor interferences exist.

The term 'interference control', as used herein, may refer to an operation of controlling the output (or power) for a neighbor TP's DL transmission signal, which is transmitted using the same frequency band as that of the DL reception signal received at the terminal. The interference control may be achieved by turning on/off the output of a data channel signal except for a control channel signal, or adjusting the output level (or power level) of the data channel signal. Information that is signaled for the interference control, may be determined in each TP by itself and exchanged between TPs, or may be determined in a separate centralized coordinator entity and shared by all TPs. The channel state between the terminal and the neighbor TP may be estimated based on the interference I_k that the terminal k receives from all neighbor TPs. If the strength for the interference signal that the terminal k receives from the neighbor TP_i is assumed to be I(i, k), I_k may be distinguished depending on whether the neighbor TP has channel information to the terminal k, as described in Equation (2) below. In addition, I(i, k) may correspond to an SRS value or a measurement report value. If I(i,k) corresponds to a measurement report value, the TP that uses the same Physical Cell IDentifier (PCID) may be recognized as one cell.

$$I\_k = \Sigma I(i, k),$$

$$i \in \{\text{all neighbor } TPs \text{ except for serving } TP\}$$

$$= \Sigma I(i\_k, k) + \Sigma I(i\_u, k),$$

$i\_k \in$ {TPs having channel information to the terminal k among all the neighbor TPs except for the serving TP}, $i\_u \in$ {TPs having no channel information to the terminal k among all the neighbor TPs except for the serving TP} (2)

In a case where at least two TPs transmit signals using the same PCID and support Multiple Input Multiple Output (MIMO) transmission, i.e., where at least two TPs transmit multiple data streams to one terminal and are different in terms of the signal that the terminal uses in estimating channel information for the serving TP and of the number of data streams, I_k may be corrected when it is calculated.

If the TP, to which interference control is applied, among the neighbor TPs is assumed to be i_c, an SINR that is considered in calculating a transmission rate for the terminal of the serving TP may be calculated using Equation (3) below.

$$SINR(A,k)' = RxP(A,k)/(\Sigma I(i\_k,k) - \Sigma(1-\text{alpha}(i\_c))*I(i\_c,k) + \Sigma I(i\_u,k) + N)$$ (3)

In Equation (3), RxP(A,k) denotes a strength of the signal that the terminal k has received from the serving TP A, I(i_k, k) denotes a strength of the interference signal that the terminal k receives from the TP i_k having channel information to the terminal k among all the neighbor TPs except for the serving TP, alpha(i_c) denotes a relative ratio of the output for a transmission signal of the TP to which interference control is applied, to the output for a transmission signal of the TP to which interference control is not applied, I(i_c,k) denotes a strength for the interference signal that the terminal k receives from the TP to which interference control is applied, and I(i_u, k) denotes a strength for the interference signal that the terminal k receives from the TP i_u having no channel information to the terminal k among all the neighbor TPs except for the serving TP.

The alpha(i_c) is determined in between (0, 1), and may have multiple values for one TP depending on the interference control technique. In order to calculate the transmission rate according to the interference control in this way, there is a need for information about the interference signal strength for the TP i_u having no channel information, such as $\Sigma I(i\_u, k) + N$ in Equation (3). A variable NI indicating interference signal strength for the TP i_u having no channel information may be calculated using Equation (4) below.

$$NI = \Sigma I(i\_u,k) + N = RxP(A,k)/SINR\_cqi(A,k) - \Sigma I(i\_k,k)$$ (4)

In Equation (4), RxP(A,k) denotes a strength of the signal that the terminal k has received from the serving TP A, SINR_cqi(A,k) denotes channel quality information of the serving TP A that the terminal k has fed back, and I(i_k, k) denotes a strength of the interference signal that the terminal k receives from the TP i_k having channel information to the terminal k among all the neighbor TPs except for the serving TP. The NI may be used after undergoing Infinite Impulse Response (IIR) filtering, and may be used after it is corrected as in Equation (5) below, depending on the CQI and SRS used for NI calculation, or the difference in the measurement time for measurement reports.

$$NI = \max(NI, 0)$$ (5)

If Equation (4) is applied to Equation (3), it may be expressed as Equation (6) below.

$$SINR(A,k)' = RxP(A,k)/(\Sigma I(i\_k,k) - \Sigma(1-\text{alpha}(i\_c))*I(i\_c,k) + NI)$$ (6)

In Equation (6), RxP(A,k) denotes a strength of the signal that the terminal k has received from the serving TP A, I(i_k, k) denotes a strength of the interference signal that the terminal k receives from the TP i_k having channel information to the terminal k among all the neighbor TPs except for the serving TP, alpha(i_c) denotes a relative ratio of the output for a transmission signal of the TP to which interference control is applied, to the output for a transmission signal of the TP to which interference control is not applied, I(i_c,k) denotes a strength for the interference signal that the terminal k receives from the neighbor TP to which interference control is applied, and NI denotes an interference signal strength for the TP i_u having no channel information.

Each part of Equation (6) may be replaced by a received SRS value or a measurement report value in the related TP. That is, all of RxP(A,k), I(i_k,k) and I(i_c,k) may be replaced by a received SRS value or a measurement report value, and NI may be converted to a formula that uses a received SRS value or a measurement report value, in Equation (4). If the measurement report value is used, the same PCID may be applied to multiple TPs. Thereafter, the serving TP may calculate a transmission rate for the terminal k by applying the SINR(A,k)' calculated by Equation (6), to Equation (1), and determine a Modulation and Coding Scheme (MCS) and a transport block size to be used for transmission. As for OLRC (k) in Equation (1), a different value may be applied depending on the interference control mode.

If n TPs transmit the same information to one terminal at the same time, Equation (6) may be converted to Equation (7). That is, the strength RxP(A_jt,k) of the signal that the terminal k has received from the TP A_jt may increase as much as the number of TPs. Here, A_jt represents a set of TPs that simultaneously transmit information to the terminal k. For example, in a case where n TPs simultaneously transmit different information to one terminal, since each signal may be separated from each other, the SINR that is considered in calculating a transmission rate for the terminal of the serving TP may be calculated in accordance with Equation (6). In addition, in a case where n TPs transmit signals to one terminal, all TPs in TP A_jt may be excluded from I(i_k, k).

$$SINR(A\_jt,k)' = \Sigma RxP(A\_jt,k)/(\Sigma I(i\_k,k) - \Sigma(1-\text{alpha}(i\_c)) \times I(i\_c,k) + NI)$$ (7)

Figure 2:
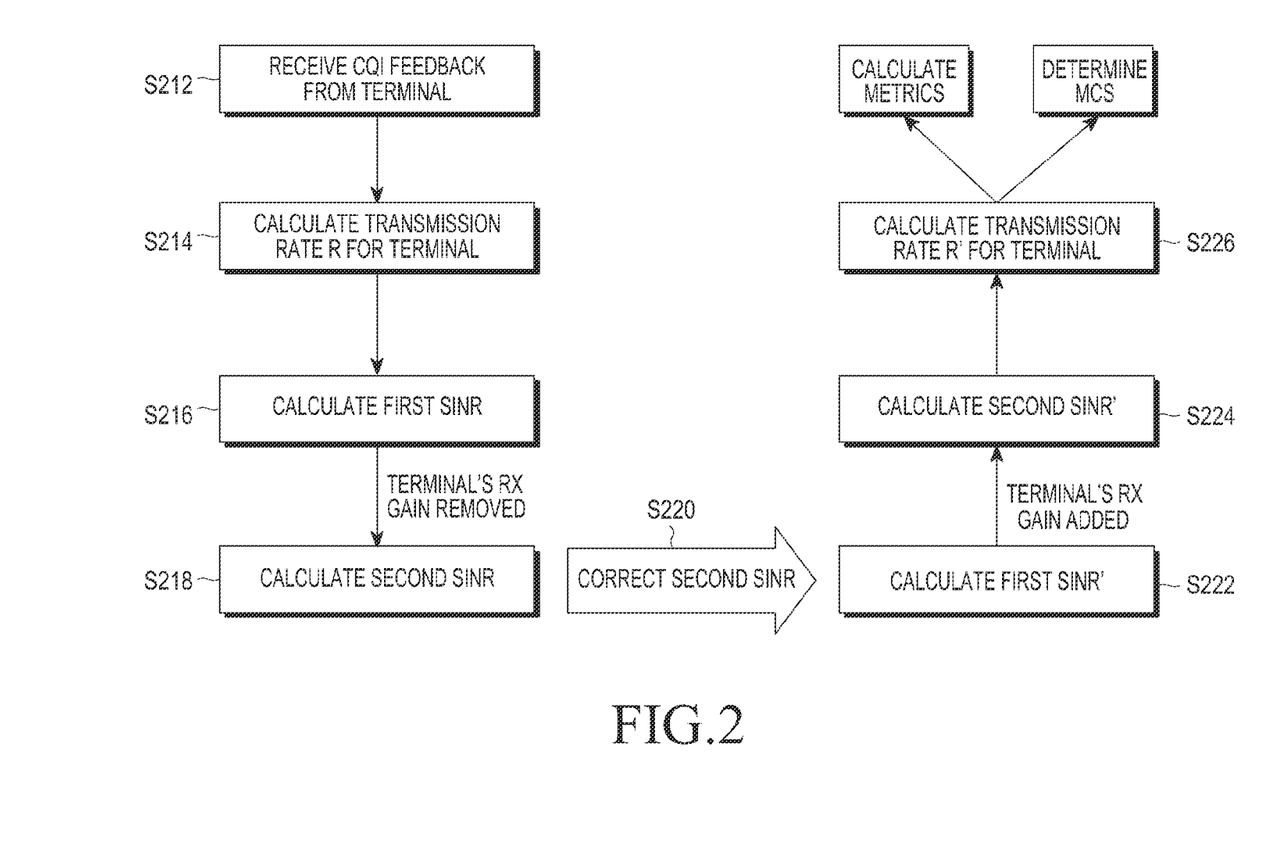
FIG. 2 is a diagram illustrating a determination of a data transmission rate, by a serving TP, for a terminal taking into account an interference signal received from a neighbor TP in a wireless communication system, according to an embodiment of the present invention.

FIG. 2 is a diagram illustrating determination of a data transmission rate, by a serving TP, for a terminal taking into account an interference signal received from a neighbor TP in a wireless communication system, according to an embodiment of the present invention.

Referring to FIG. 2, the serving TP receives a CQI fed back from a terminal, in step S212. The serving TP calculates a data transmission rate R for the terminal using, for example, Equation (1), in step S214.

In step S216, the serving TP calculates a first SINR between the terminal and the serving TP based on the transmission signal including a terminal's receive gain, and removes the terminal's receive gain from the transmission signal. The terminal's receive gain is an additional gain excluding a gain for the signal received from the serving TP. Typically, the terminal's receive gain may include an antenna gain. In step S218, the serving TP calculates a second SINR between the terminal and the serving TP based on the transmission signal from which the terminal's receive gain is removed. Thereafter, in step S220, the serving TP may correct the second SINR using, for example, Equations (2) to (7).

In step S222, the serving TP calculates a first SINR' between the terminal and the serving TP based on the transmission signal from which the terminal's receive gain is removed, using, for example, Equation (7), and adds the terminal's receive gain to the transmission signal. The previously calculated first and second SINRs are the SINRs that are calculated without considering the interference signal, so the first SINR is distinguishable or different from the first SINR'. The first SINR' and a second SINR', described below, are the SINRs that are calculated taking into account the interference signal.

In step S224, the serving TP calculates a second SINR' between the terminal and the serving TP based on the transmission signal to which the terminal's receive gain is added. In step S226, the serving TP calculates a transmission rate R' for the terminal taking into account the second SINR'. The previously calculated transmission rate R is the transmission rate that is calculated without considering the interference signal, so the transmission rate R is distinguishable or different from the transmission rate R'. The transmission rate R' is the transmission rate that is calculated taking into the interference signal.

Thereafter, the serving TP may calculate the metrics to be used for transmission, and determine an MCS.

Figure 3:
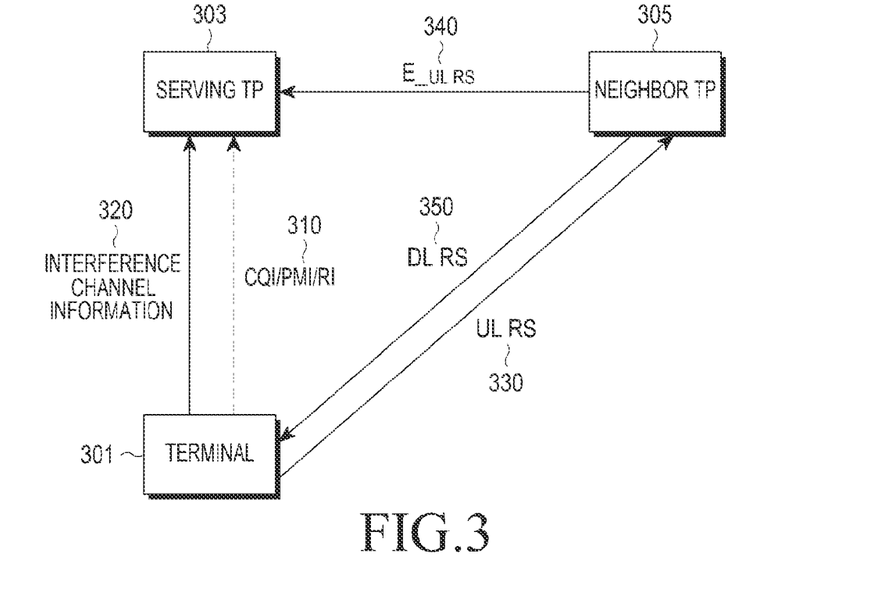
FIG. 3 is a diagram illustrating the acquiring and exchanging of channel information for channel estimation, according to an embodiment of the present invention.

FIG. 3 is a diagram illustrating the acquiring and exchanging of channel information for channel estimation, according to an embodiment of the present invention.

Referring to FIG. 3, in step 310, a terminal 301 feeds back, to a serving TP 303, a message including an index indicating channel quality information, such as, for example, CQI, PMI or RI. The channel quality information may include information about a ratio of an interference signal for a neighbor TP to a signal of the serving TP, which is measured in resources designated by the serving TP 303. In step 320, the terminal 301 feeds back, to the serving TP 303, interference channel information for an interference channel in addition to the channel quality information. The interference channel information is information that is measured based on a DL Reference Signal (RS) that the terminal 301 has received from a neighbor TP 305 in step 350.

In step 330, the neighbor TP 305 receives a UL RS transmitted by the terminal 301. In step 340, the neighbor TP 305 transmits received power strength of the received UL RS to the serving TP 303 in the form of $E_{\_UL\_RS}$, intact or after processing it. The form of $E_{\_UL\_RS}$ is described in greater detail with reference to Table 1 below. The information that is transmitted in step 340 may be UL RS information that is received from all TPs, so the serving TP 303 may recognize the information received in step 340 as distance information between the terminal 301 and each TP, or path loss information of a wireless channel between the terminal 301 and each TP.

The serving TP 303 may receive UL RS from the terminal 301, and each of the neighbor TP 305 and the serving TP 303 may receive a UL RS from all available terminals. The neighbor TP information or terminal information needed for UL RS reception may be shared among related TPs through a separate procedure.

The neighbor TP information needed for reception of a UL RS from the terminal 301 may include at least one of PCID information, information about the time domain and frequency domain of UL RS resources used by the related TP, and cyclic shift-related information. The terminal information needed for UL RS reception may include at least one of information about the time domain and frequency domain of UL RS resources used by the terminal that receives a communication service through the related TP, and cyclic shift-related information.

When transmitting the received power strength for the UL RS from the terminal 301 to the serving TP 303, the neighbor TP 305 may transmit a value obtained by processing received power strength for the DL RS of the neighbor TP 305, or may transmit received power strength for the DL RS, allowing the serving TP 303 to directly process the received power strength for the DL RS. The neighbor TP 305 may transmit received UL RS information not only for the terminal 301, but also for all available terminals, to the serving TP to which each of the terminals belongs. The neighbor TP 305 may share received UL RS information for all available terminals with other neighbor TPs, or may share received UL RS information for the terminal 301 only with the serving TP 303, using the shared information. Since the amount of information for the received UL RS information is proportional to a load of a link between TPs, each terminal may share received UL RS information only with the serving TP to which the terminal itself belongs, thereby reducing the load of a link between TPs.

The received UL RS information (e.g., the form of $E_{\_UL\_RS}$) that is transmitted from the neighbor TP 305 to the serving TP 303 in step 340, and information included in Received SRS_power in information constituting the form of $E_{\_UL\_RS}$ may be expressed as shown in Table 1.

TABLE 1

| $E_{\_UL\_RS}$ | { |
|---|---|
| | Serving TP ID; |
| | Received TP ID; |
| | Received SRS_power[ ] |
| | Received TP DL_Tx_Power |
| } | |
| Received SRS_power | { |
| | Received time; |
| | Received frequency; |
| | Received cyclic shift; |
| | Received comb; |
| | Received power; |
| } | |

As illustrated in Table 1, the form of $E_{\_UL\_RS}$ may include at least one Serving TP ID, Received TP ID, Received SRS_power[ ], and Received TP DL_Tx_Power. Serving TP ID denotes an Identifier (ID) of the serving TP 303, Received TP ID denotes an ID of the neighbor TP 305 that has received a UL RS, Received SRS_power[ ] denotes a set of UL RS information received from all neighbor TPs, and Received TP DL_Tx_Power denotes DL transmit power of the neighbor TP 305.

In addition, Received SRS_power[ ] may include Received time, Received frequency, Received cyclic shift, Received comb, and Received power. Received time denotes the time a UL RS is received from the terminal 301, Received frequency denotes information about a frequency interval (or a frequency band) where the UL RS is received, Received cyclic shift denotes cyclic shift information for the UL RS, Received comb denotes information about the resources to which an SRS is allocated, and Received power denotes received power strength for the UL RS.

For example, if it is assumed that a time interval for receiving a UL RS is defined between the serving TP 303 and the neighbor TP 305, and terminals of the TP divide UL RS resources into frequency intervals and cyclic shifts, the serving TP 303 may detect a terminal that is matched to Received SRS_power even though the serving TP 303 does not designate a separate terminal ID. In other words, the resources distinguished by the time interval, frequency interval and cyclic shift information may be matched to one terminal. In addition, DL transmit power of the neighbor TP 305 may be transmitted to another neighbor TP through a separate message each time the transmit power is changed.

Upon receiving $E_{\_UL\_RS}$ from the neighbor TP 305, the serving TP 303 may detect a terminal that is matched to Received SRS_power included in $E_{\_UL\_RS}$. In addition, the serving TP 303 may obtain relative channel information between the terminal 301 and the neighbor TP 305 by processing received power strength of a UL RS for the detected terminal (e.g., the terminal 301) and DL transmit power of the neighbor TP 305. The processing of the DL transmit power for acquisition of the relative channel information may be expressed as a product of the received power strength of a UL RS and DL transmit power by the neighbor TP 305.

Regarding the relative channel information, the range of its value may be adjusted in order to replace each part of Equation (6) with a received SRS value. In other words, if an RxP value indicating a DL received signal strength (or power) value of the serving TP 303 or the neighbor TP 305 is known, a formula for calculating a relative coefficient 'a' based on the received SRS value and RxP value which are relative channel information for the TP, and a formula for replacing the remaining received SRS value with I(i_k, k) in Equation (6) using the relative coefficient 'a' may be defined as Equation (8) below.

$$a = SRS\_received\_power(A,k)/RxP(A,k)$$

$$I(B,k) = a * SRS\_received\_power(B,k) \quad (8)$$

In Equation (8), SRS_received_power(A,k) denotes a power of the SRS that the terminal k has received from the serving TP A, RxP(A,k) denotes a power of the signal that the terminal k has received from the serving TP A, and SRS_received_power(B,k) denotes a power of the SRS that the terminal k has received from a serving TP B. Since SRS_received_power(A,k) and RxP(A,k), which are considered in calculating the relative coefficient 'a', is information that is fed back from the terminal, and an SINR is a proportional value, the adjustment of the range of the received SRS value may not be used if all values are replaced with the received SRS value.

FIG. 4 is a diagram illustrating the acquiring and exchanging of channel information for channel estimation, according to another embodiment of the present disclosure.

Referring to FIG. 4, in step 410, a terminal 401 feeds back, to a serving TP 403, a message including an index indicating channel quality information, such as, for example, CQI, PMI, or RI. The channel quality information may include information about a ratio of an interference signal for a neighbor TP to a signal of the serving TP, which is measured in resources designated by the serving TP 403. In step 420, the terminal 401 feeds back, to the serving TP 403, interference channel information for an interference channel in addition to the channel quality information. The interference channel information is information that is measured based on a DL RS that the terminal 401 has received from a neighbor TP 405 in step 440.

In step 430, the terminal 401 transmits a UL RS to the neighbor TP 405. The UL RS may be received at all available neighbor TPs including the serving TP 403. In step 450, the neighbor TP 405 transmits information about the received UL RS to the coordinator 407. The UL RS information that is transmitted in step 450 may be transmitted in the form of either $E_{\_UL\_RS}'$ or $E_{\_UL\_RS}$ depending on the circumstances.

The coordinator 407 may generate interference control information using the scheduling information provided from each TP separately from the UL RS information received in step 450, and transmit the received UL RS information to each serving TP to which each terminal belongs. In other words, the coordinator 407 may transmit the received UL RS information to the serving TP 403 to which the terminal 401 belongs.

If the UL RS information, which is transmitted in step 450, is transmitted in the form of $E_{\_UL\_RS}'$, the form of the information transmitted to the coordinator 407 may be different from the form of the information that the coordinator 407 transmits to the serving TP 403.

For example, the neighbor TP 405 may transmit the received UL RS information to the coordinator 407 without processing it, causing a separate entity in the coordinator 407 to perform the processing operation that is added due to the information processing that the neighbor TP 405 should perform. In this case, upon receiving the UL RS signal from the terminal 401, the neighbor TP 405 may transmit the UL RS information to the coordinator 407 in the form of E_UL_RS'. Information that is included in the form of $E_{\_UL\_RS}'$ and information included in Received SRS_power in the information constituting the form of $E_{\_UL\_RS}'$ may be expressed as shown in Table 2 below.

TABLE 2

| E_UL_RS' | { |
| --- | --- |
|  | Received TP ID |
|  | Received SRS_power[ ] |
|  | Received TP DL_Tx_Power |
|  | } |
| Received SRS_power | { |
|  | Received time; |
|  | Received frequency; |
|  | Received cyclic shift; |
|  | Received comb; |
|  | Received power; |
|  | } |

As illustrated in Table 2, the form of $E_{\_UL\_RS}'$ may include Received TP ID, Received SRS_power[ ], and Received TP DL_Tx_Power. Here, Received TP ID denotes an ID of the neighbor TP 405 that has received a ULR S, Received SRS_power[ ] denotes a set of UL RS information received from all neighbor TPs, and Received TP DL_Tx_Power denotes DL transmit power of the neighbor TP 405.

In addition, Received SRS_power[ ] may include Received time, Received frequency, Received cyclic shift, Received comb, and Received power. Received time denotes the time a UL RS is received from the terminal 401, Received frequency denotes information about a frequency interval (or a frequency band) where the UL RS is received, Received cyclic shift denotes cyclic shift information for the UL RS, Received comb denotes information about the resources to which an SRS is allocated, and Received power denotes received power strength for the UL RS.

The coordinator 407 may obtain relative channel information between the terminal 401 and the neighbor TP 405 by processing the received UL RS information and the DL transmit power of the neighbor TP 405. The obtained relative channel information may be used to generate interference control information, and may be transmitted to the serving TP 403 in the form of $E_{\_UL\_RS}$. The form of $E_{\_UL\_RS}$ and information included in Received SRS_power in the information constituting the form of $E_{\_UL\_RS}$ has been described above with reference to Table 1, so a detailed description thereof will be omitted.

As is apparent from the foregoing description, according to an embodiment of the present invention, a serving TP providing a communication service to a terminal may determine a data transmission rate for the terminal taking into account an interference signal due to a neighbor TP of the terminal, thereby making it possible to estimate more accurate channel state information.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method for controlling interference by a transmission point (TP) in a wireless communication system, the method comprising:
   receiving a first message, which includes channel quality information for the TP and relative channel information being measured based on a received power of a reference signal received from a terminal and a downlink (DL) transmit power of a related neighbor TP, from the terminal to which the TP provides a communication service;
   receiving a second message, which includes received power information for the reference signal received from the terminal, from at least one neighbor TP; and
   determining a data transmission rate for the terminal based on the channel quality information, the relative channel information and the received power information.

2. The method of claim 1, wherein the channel quality information represents a ratio of a strength of an interference signal caused by the at least one neighbor TP to a strength of a TP signal measured in a resource area designated by the TP.

3. The method of claim 2, wherein the strength of the interference signal is calculated based on a first interference signal strength that is received from a first neighbor TP that has information related to a channel to the terminal, and a second interference signal strength that is received from a second neighbor TP that has no information related to the channel to the terminal.

4. The method of claim 3, wherein the strength of the interference signal I_k is calculated by the following equation;

$$I\_k = \Sigma I(i\_k,k) + \Sigma I(i\_u,k)$$

where k denotes an index indicating the terminal, i_k denotes an index indicating the first TP having information about the channel to the terminal k among all neighbor TPs except for the TP, i_u denotes an index indicating the second TP having no information about the channel to the terminal k among all the neighbor TPs except for the TP, $\Sigma I(i\_k,k)$ denotes a sum of interference signal strengths that the terminal k receives from a TP(i_k), and $\Sigma I(i\_u,k)$ denotes a sum of interference signal strengths that the terminal k receives from a TP(i_u).

5. The method of claim 1, wherein the second message further includes at least one of an identifier (ID) of the TP, an ID of the at least one neighbor TP, and downlink (DL) transmit power-related information of the at least one neighbor TP.

6. The method of claim 1, wherein the received power information includes at least one of time interval information, frequency interval information, cyclic shift-related information, information about resources to which the reference signal is allocated, and received power strength-related information, for a signal received from the terminal.

7. The method of claim 1, further comprising:
   detecting the terminal based on at least one of time interval information, frequency interval information, and cyclic shift-related information;
   wherein resources distinguished by at least one of the time interval information, the frequency interval information, and the cyclic shift-related information are matched to a specific terminal.

8. The method of claim 1, wherein the relative channel information is calculated by multiplying the received powers of the reference signal by the DL transmit power of the related neighbor TP.

9. The method of claim 1, further comprising:
   receiving relative channel information between the terminal and a related neighbor TP from a coordinator, if the second message is received through the coordinator.

10. A transmission point (TP) for controlling interference in a wireless communication system, the TP comprising:
    a receiver configured to receive a first message, which includes channel quality information for the TP and relative channel information being measured based on a received power of a reference signal received from a terminal and a downlink (DL) transmit power of a related neighbor TP, from the terminal to which the TP provides a communication service, and to receive a second message, which includes received power information for a reference signal received from the terminal, from at least one neighbor TP; and
    a controller configured to determine a data transmission rate for the terminal based on the channel quality information, the relative channel information and the received power information.

11. The TP of claim 10, wherein the channel quality information represents a ratio of a strength of an interference signal caused by the at least one neighbor TP to a strength of a TP signal measured in a resource area designated by the TP.

12. The TP of claim 11, wherein the strength of the interference signal is calculated based on a first interference signal strength that is received from a first neighbor TP that has information related to a channel to the terminal, and a second interference signal strength that is received from a second neighbor TP that has no information related to the channel to the terminal.

13. The TP of claim 12, wherein the strength of the interference signal I_k is calculated by the following equation;

$$I\_k = \Sigma I(i\_k,k) + \Sigma I(i\_u,k)$$

where k denotes an index indicating the terminal, i_k denotes an index indicating the first TP having information about the channel to the terminal k among all neighbor TPs except for the TP, i_u denotes an index indicating the second TP having no information about the channel to the terminal k among all the neighbor TPs except for the TP, $\Sigma I(i\_k,k)$ denotes a sum of interference signal strengths that the terminal k receives from a TP(i_k), and $\Sigma I(i\_u,k)$ denotes a sum of interference signal strengths that the terminal k receives from a TP(i_u).

14. The TP of claim 10, wherein the second message further includes at least one of an identifier (ID) of the TP, an ID of the at least one neighbor TP, and downlink (DL) transmit power-related information of the at least one neighbor TP.

15. The TP of claim 10, wherein the received power information includes at least one of time interval information, frequency interval information, cyclic shift-related information, information about resources to which the reference signal is allocated, and received power strength-related information, for a signal received from the terminal.

16. The TP of claim 10, wherein the controller is configured to detect the terminal based on at least one of time interval information, frequency interval information and cyclic shift-related information; and
  wherein resources distinguished by at least one of the time interval information, the frequency interval information, and the cyclic shift-related information are matched to a specific terminal.

17. The TP of claim 10, wherein the relative channel information is calculated by multiplying the received power of the reference signal by the DL transmit power of the related neighbor TP.

18. The TP of claim 10, wherein the receiver is configured to receive relative channel information between the terminal and a related neighbor TP from a coordinator, if the second message is received through the coordinator.

* * * * *